(12) United States Patent
Suzuki et al.

(10) Patent No.: US 9,778,431 B2
(45) Date of Patent: Oct. 3, 2017

(54) COMMUNICATION LIGHT VISUALIZATION MODULE

(71) Applicant: Hitachi Metals, Ltd., Tokyo (JP)

(72) Inventors: Kanako Suzuki, Hitachi (JP); Mikio Ohkoshi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/255,045

(22) Filed: Sep. 1, 2016

(65) Prior Publication Data

US 2017/0068063 A1    Mar. 9, 2017

(30) Foreign Application Priority Data

Sep. 8, 2015 (JP) ................. 2015-176639

(51) Int. Cl.
| | | |
|---|---|---|
| *G02B 6/36* | (2006.01) | |
| *G02B 6/44* | (2006.01) | |
| *H04B 10/073* | (2013.01) | |
| *G02B 6/38* | (2006.01) | |

(52) U.S. Cl.
CPC ........... *G02B 6/4452* (2013.01); *G02B 6/385* (2013.01); *G02B 6/3825* (2013.01); *G02B 6/4453* (2013.01); *H04B 10/0731* (2013.01)

(58) Field of Classification Search
CPC . G02B 6/4452; G02B 6/3825; H04B 10/0731
USPC ..................................... 385/88–92, 135, 147
See application file for complete search history.

(56) References Cited

U.S. PATENT DOCUMENTS

| | | | |
|---|---|---|---|
| 2009/0074369 A1* | 3/2009 | Bolton ................. | G02B 6/4441 385/135 |
| 2010/0008676 A1 | 1/2010 | Kojima et al. | |
| 2010/0054682 A1* | 3/2010 | Cooke ................. | G02B 6/4455 385/135 |
| 2010/0329604 A1 | 12/2010 | Kojima et al. | |
| 2011/0025514 A1* | 2/2011 | Gau ..................... | G02B 6/4274 340/636.1 |
| 2012/0114295 A1* | 5/2012 | Guzzo ................. | G02B 6/4452 385/135 |
| 2015/0362691 A1* | 12/2015 | Montgelas ........... | G02B 6/4452 385/135 |

FOREIGN PATENT DOCUMENTS

| | | |
|---|---|---|
| JP | 2009-145676 A | 7/2009 |
| JP | 2010-231082 A | 10/2010 |
| JP | 2011-013359 A | 1/2011 |
| JP | 2011-013360 A | 1/2011 |

\* cited by examiner

*Primary Examiner* — Ellen Kim
(74) *Attorney, Agent, or Firm* — McGinn IP Law Group, PLLC

(57) ABSTRACT

A communication light visualization module includes multiple communication light visualization adapters into which an optical connector is fitted and to which the optical connector is optically connected and a housing that houses the communication light visualization adapters in an arrangement manner. Each of the communication light visualization adapters includes a light extraction hole from which part of communication light transmitted through an optical communication path is extracted. The housing includes a common protection cover that collectively covers the light extraction holes of the plurality of communication light visualization adapters or collectively renders the light extraction holes uncovered.

4 Claims, 3 Drawing Sheets

COMMUNICATION LIGHT VISUALIZATION MODULE

The present application is based on Japanese patent application No. 2015-176639 filed on Sep. 8, 2015, the entire contents of which are incorporated herein by reference.

BACKGROUND OF THE INVENTION

1. Field of the Invention

The present invention relates to a communication light visualization module that visualizes communication light transmitted through an optical communication path for visually checking the communication status of the optical communication path.

2. Description of the Related Art

To date, communication light visualization modules for visualizing communication light transmitted through an optical communication path have been used in optical communication facilities to visually check the communication status of the optical communication path (for example, whether the optical communication path is in use or not in use).

Known examples of the communication light visualization module include a communication light visualization module 500, which includes, as illustrated in FIG. 5, multiple communication light visualization adapters 501 and a housing 502. Optical connectors such as a SC connector and a LC connector are fitted into and optically connected to the communication light visualization adapters 501. The housing 502 houses the multiple communication light visualization adapters 501 in an arrangement manner.

Here, each of the multiple communication light visualization adapters 501 includes a light extraction hole 503, from which part of the communication light transmitted through an optical communication path is extracted. The housing 502 includes multiple protection covers 504 that individually cover the light extraction holes 503 of the respective communication light visualization adapters 501 or individually render the light extraction holes 503 uncovered.

In the communication light visualization module 500, except when the communication status of the optical communication path is visually checked, the protection covers 504 are placed in a closed position to cover the respective light extraction holes 503 to prevent intrusion of foreign matter. When the communication status of the optical communication path is visually checked, the protection covers 504 are placed in an open position to open the light extraction holes 503 so that a communication light detector is allowed to be fitted into the light extraction holes 503.

Reference is made to Japanese Unexamined Patent Application Publication No. 2009-145676, Japanese Unexamined Patent Application Publication No. 2010-231082, Japanese Unexamined Patent Application Publication No. 2011-013359, and Japanese Unexamined Patent Application Publication No. 2011-013360.

With a recent increase in channel capacity, the number of communication light visualization adapters 501 housed in the communication light visualization module 500 has been increasing. Every time the communication status of an optical communication path is visually checked, a need of individually handling the protection covers 504 arises to individually cover the light extraction holes 503 of the multiple communication light visualization adapters 501 or individually render the light extraction holes 503 uncovered.

As the number of communication light visualization adapters 501 housed in the communication light visualization module 500 increases, the handling of the protection covers 504 for visual check of the communication status of optical communication paths becomes more troublesome.

SUMMARY OF THE INVENTION

Accordingly, it is an object of the present invention to provide a communication light visualization module to simplify handling of protection covers for visual check of the communication status of optical communication paths.

In the present invention, a communication light visualization module includes multiple communication light visualization adapters into which an optical connector is fitted and to which the optical connector is optically connected and a housing that houses the plurality of communication light visualization adapters in an arrangement manner. Each of the communication light visualization adapters includes a light extraction hole from which part of communication light transmitted through an optical communication path is extracted. The housing includes a common protection cover that collectively covers the light extraction holes of the plurality of communication light visualization adapters or collectively renders the light extraction holes uncovered.

Preferably, the common protection cover is attached to the housing so as to be movable between a closed position, in which the common protection cover collectively covers the light extraction holes of the communication light visualization adapters, and an open position, in which the common protection cover collectively renders the light extraction holes of the communication light visualization adapters uncovered.

Preferably, the common protection cover is made of a material that transmits the communication light transmitted through the optical communication path.

Preferably, the common protection cover includes multiple hollow portions that are recessed toward the respective light extraction holes of the communication light visualization adapters.

Preferably, the housing includes a hook portion engaged on a patch panel.

The present invention is capable of providing a communication light visualization module that simplifies handling of protection covers for visual check of the communication status of optical communication paths.

DESCRIPTION OF THE PREFERRED EMBODIMENT

An embodiment of the present invention is described below with reference to appended drawings.

Figure 1:
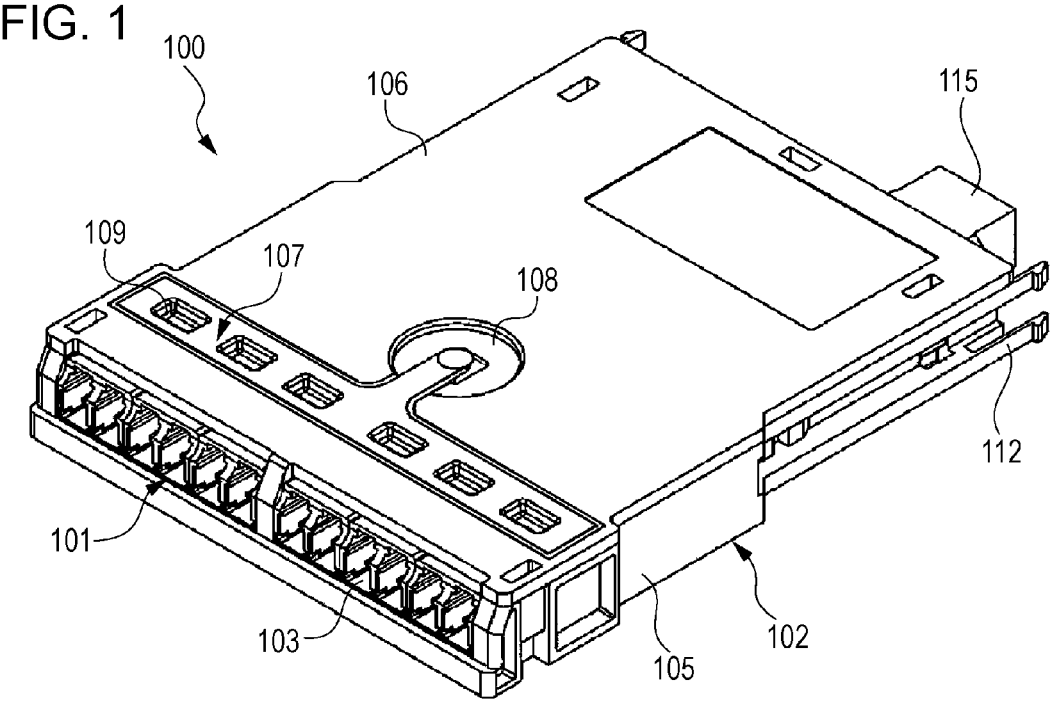
FIG. 1 is a perspective view of the appearance of a communication light visualization module according to an embodiment of the present invention and in the state where a common protection cover is in a closed position.
Figure 2:
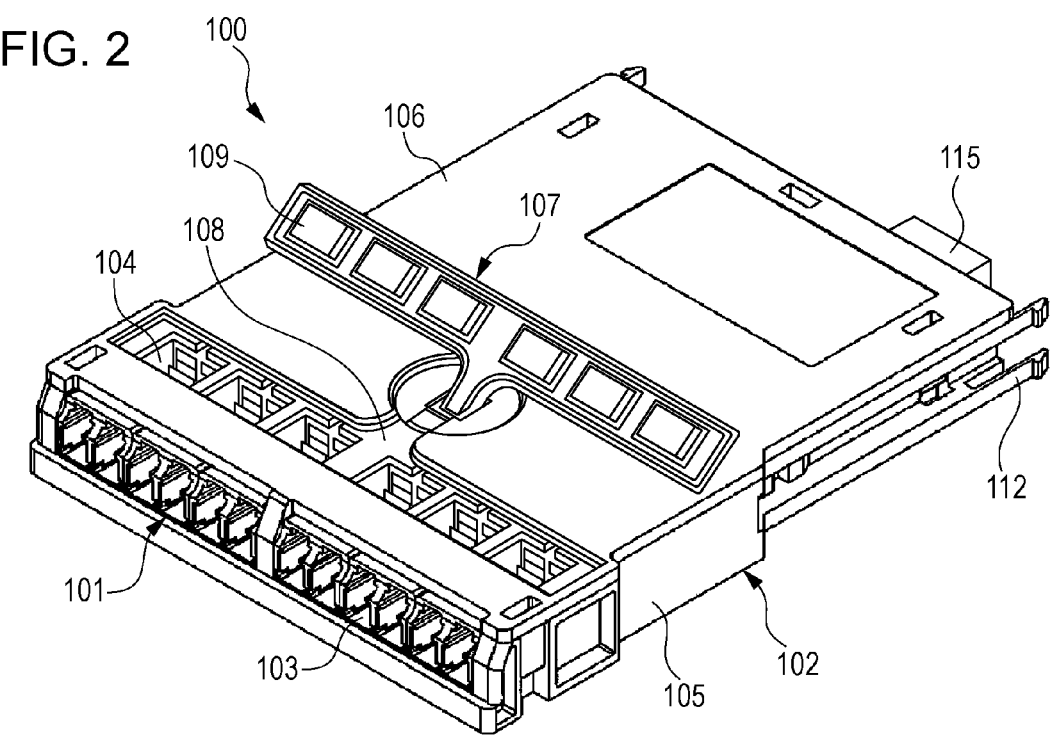
FIG. 2 is a perspective view of the appearance of the communication light visualization module according to the embodiment of the present invention and in the state where the common protection cover is in an open position.

As illustrated in FIG. 1 and FIG. 2, a communication light visualization module 100 according to an embodiment of the present invention includes multiple communication light visualization adapters 101, into which optical connectors including a SC connector and a LC connector (not illustrated) are fitted and to which the optical connectors are optically connected, and a housing 102, which houses the multiple communication light visualization adapters 101 in an arrangement manner.

Each of the multiple communication light visualization adapters 101 includes a socket 103, into which an optical connector that is to be attached to an end portion of an optical communication path (for example, an optical fiber) is fitted, and a light extraction hole 104, from which part of communication light transmitted through the optical communication path is extracted when an optical connector is fitted into the socket 103 and optically connected to the communication light visualization adapter 101.

Each socket 103 has a shape that conforms with the optical connector standard (for example, JIS). Each light extraction hole 104 has a shape that matches the shape of a light-receiving portion of a communication light detector that is fitted into the light extraction hole 104 for visual check of the communication status of an optical communication path.

Each light extraction hole 104 is used, not to extract part of communication light transmitted through the optical communication path, but to guide, outward from the inside of the corresponding communication light visualization adapter 101, part of the communication light extracted through a transmission loss generator (for example, optical-axis misalignment portion) inside the communication light visualization module 100.

The housing 102 includes a casing 105, an upper cover 106, and a common protection cover 107. The multiple communication light visualization adapters 101 are disposed in the casing 105 so as to be arranged along one surface (front surface in the drawing) and an excess length of the optical communication path is housed in the casing 105. The upper cover 106 covers one surface (upper surface in the drawing) of the casing 105 to seal the casing 105. The common protection cover 107 is used to collectively cover the light extraction holes 104 of the respective communication light visualization adapters 101 or collectively render the light extraction holes 104 uncovered.

The casing 105 and the upper cover 106 are made of a material that transmits neither communication light transmitted through an optical communication path nor natural light, such as outdoor sunlight or indoor light from a fluorescent light, in order to prevent a communication light detector from malfunctioning when the communication status of an optical communication path is visually checked.

The reason why the casing 105 and the upper cover 106 are made of the above-described material is described as follows. For visual check of the communication status of an optical communication path, part of the communication light transmitted through the optical communication path needs to be extracted. Here, in view of reduction of a transmission loss in the optical communication path, it is preferable to minimize a loss accompanying the extracting of the communication light. Even when the loss accompanying the extracting of the communication light is reduced, natural light such as outdoor sunlight or indoor light from a fluorescent light needs to be prevented from arriving at a light-receiving portion of a communication light detector for reliable visual check of the communication status of an optical communication path.

The common protection cover 107 is attached to the housing 102 so as to be movable between a closed position (see FIG. 1) and an open position (see FIG. 2). In the closed position, the common protection cover 107 collectively covers the light extraction holes 104 of the multiple communication light visualization adapters 101. In the open position, the common protection cover 107 collectively renders the light extraction holes 104 of the multiple communication light visualization adapters 101 uncovered.

In the communication light visualization module 100, the common protection cover 107 is rotatably attached to the housing 102. By rotating the common protection cover 107 around its rotation axis, the common protection cover 107 is rotatably handleable between the closed position and the open position.

The common protection cover 107 is disposed at a flatly recessed portion 108, formed in a top surface of the upper cover 106, so as not to protrude from the top surface of the upper cover 106. This configuration allows multiple communication light visualization module 100 to be superposed one on top of another and enables improvement of compactness of the communication light visualization module 100 when mounted in optical communication facilities.

Furthermore, the common protection cover 107 is made of a material that transmits the communication light transmitted through the optical communication path. This configuration allows the communication status of an optical communication path to be visually checked by a simple visual identification of the communication light through the common protection cover 107 without using a communication light detector in the case where the communication light is visible light.

The common protection cover 107 also includes multiple hollow portions 109, which are recessed toward the light extraction holes 104 of the multiple communication light visualization adapters 101 so as to be fitted into the respective light extraction holes 104.

Even though the common protection cover 107, which collectively covers the light extraction holes 104 of the multiple communication light visualization adapters 101 or collectively renders the light extraction holes uncovered, is used, the light extraction holes 104 can be secured against intrusion of foreign matter since the hollow portions 109 are fitted into the respective light extraction holes 104 of the multiple communication light visualization adapters 101.

In the case where the communication light is visible light, beams of the communication light from adjacent light extraction holes 104 may be mixed together and this mixture may hinder visual check of the communication status of each optical communication path. However, the hollow portions 109 can reliably distinguish adjacent light extraction holes 104 from one another and enable reliable visual check to determine from which light extraction hole 104 a beam of the communication light is extracted.

Figure 3:
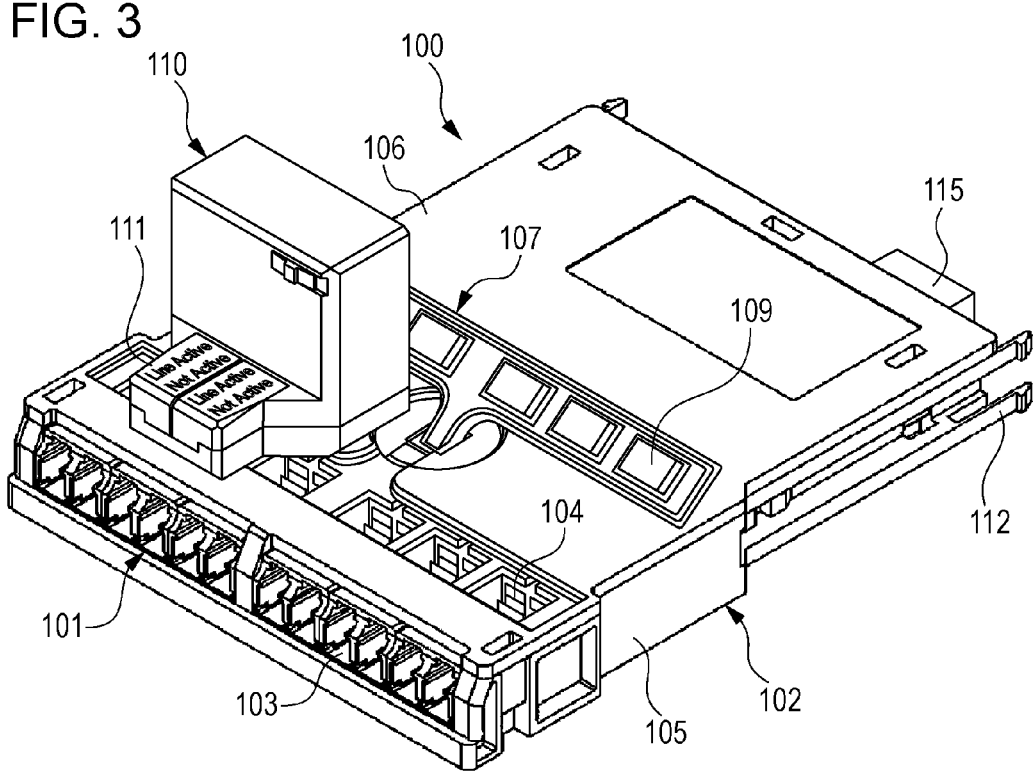
FIG. 3 is a perspective view of the appearance of the communication light visualization module illustrated in FIG. 1 and FIG. 2 and in the state where the communication status of an optical communication path is visually checked.

As illustrated in FIG. 3, when the communication status of an optical communication path is to be visually checked using the communication light visualization module 100, the common protection cover 107 is moved to the open position to render the light extraction holes 104 uncovered and to allow a communication light detector 110 to be inserted into the light extraction holes 104. Then, the communication light detector 110 is fitted into each of the light extraction holes 104 to detect the communication light. Thus, the communication status of the optical communication path can be visually checked through a display portion 111 of the communication light detector 110.

The housing 102 also includes hook portions 112, which are engaged on a patch panel 113. A pair of hook portions 112 are formed on each of side surfaces (left and right surfaces in the drawing) of the housing 102. This configuration enables reliable fastening of the communication light visualization module 100 to the patch panel 113 and facilitates removal of the communication light visualization module 100 from the patch panel 113.

Figure 4:
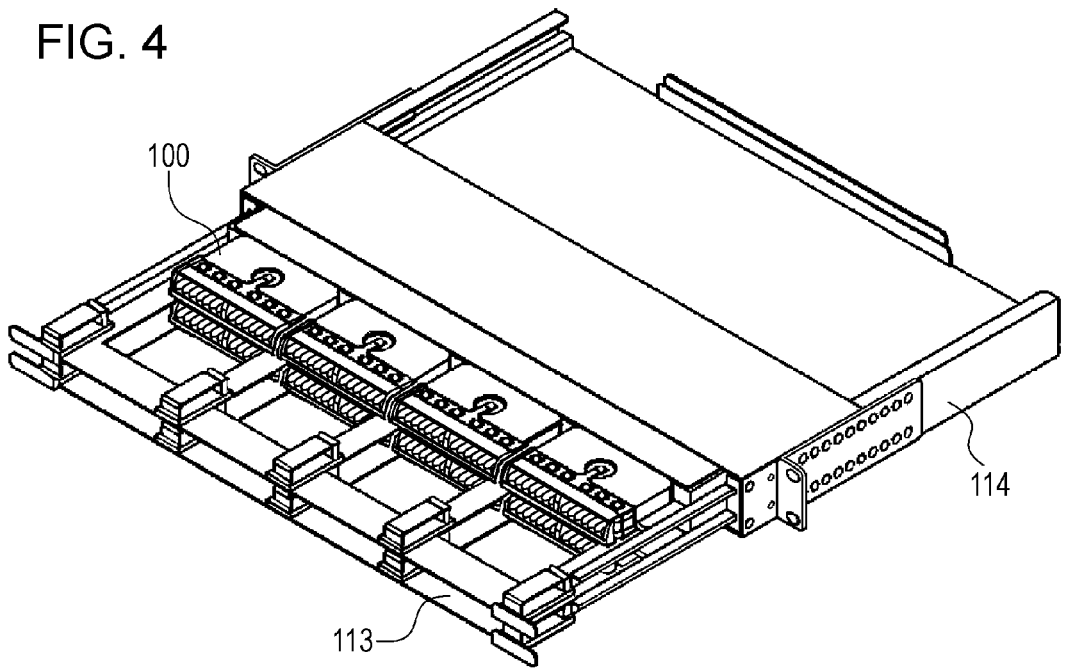
FIG. 4 is a perspective view of the appearance of the communication light visualization module illustrated in FIG. 1 and FIG. 2 and illustrates an example of how the module is used in optical communication facilities.
Figure 5:
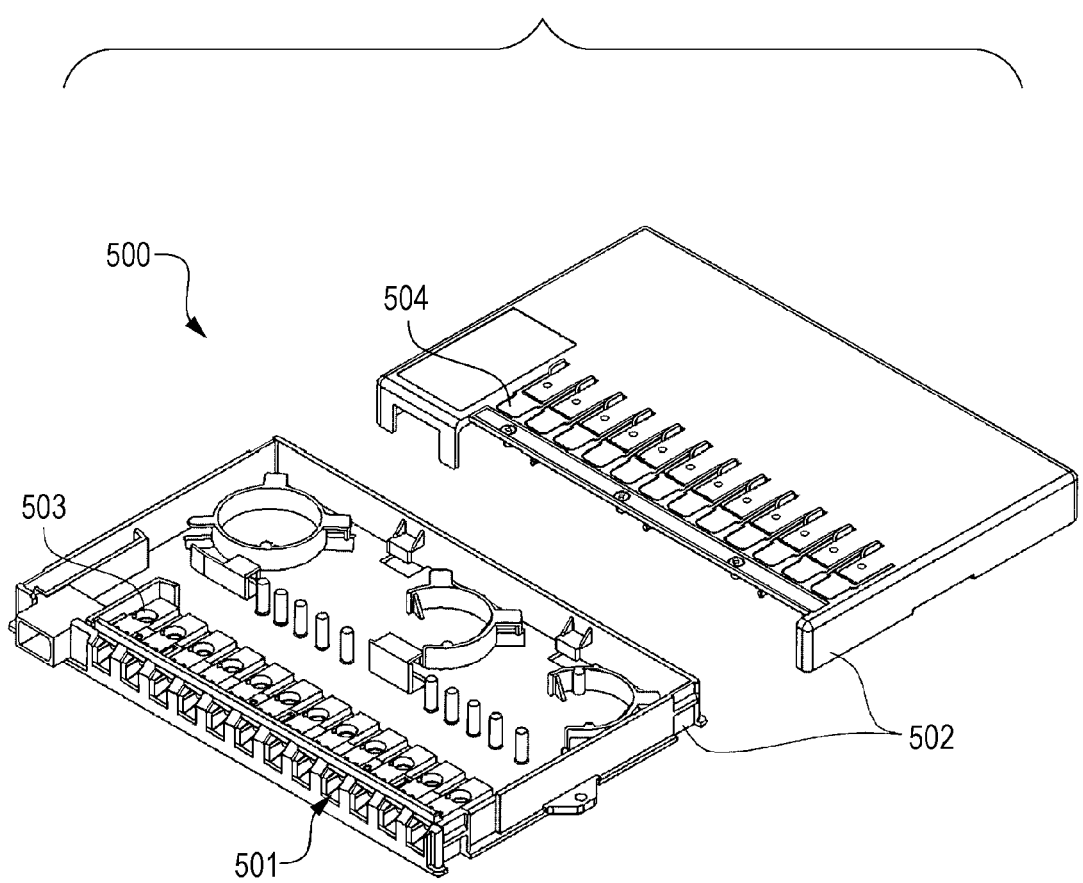
FIG. 5 is an exploded perspective view of the appearance of an existing communication light visualization module.

In the case, for example, where the communication light visualization module 100 is used in optical communication facilities, as illustrated in FIG. 4, communication light visualization modules 100 are attached to multiple patch panels 113, superposed one on top of the other, and the patch panels 113 are housed in a rack 114.

Here, an upper patch panel 113 and a lower patch panel 113 are housed so as to be slidable over each other forward and rearward. By withdrawing one of the patch panels 113 to which the communication light visualization module 100 in which the communication status of an intended optical communication path is to be visually checked is attached and by detecting the communication light in the above-described manner, the communication status of the optical communication path can be visually checked.

The housing 102 includes a multifiber push-on (MPO) adapter 115 so that optical fibers and the like are collectively withdrawn to the back of the rack 114.

As described above, the communication light visualization module 100 according to an embodiment of the present invention includes the common protection cover 107, which collectively covers the light extraction holes 104 of the multiple communication light visualization adapters 101 or collectively renders the light extraction holes 104 uncovered. Thus, the communication light visualization module 100 facilitates handling of the protection covers for visual check of the communication status of an optical communication path.

What is claimed is:

1. A communication light visualization module, comprising:
 a plurality of communication light visualization adapters into which an optical connector is fitted and to which the optical connector is optically connected; and
 a housing that houses the plurality of communication light visualization adapters in an arrangement manner,
 wherein each of the plurality of communication light visualization adapters includes a light extraction hole from which part of communication light transmitted through an optical communication path is extracted, and
 wherein the housing includes a common protection cover that collectively covers the light extraction holes of the plurality of communication light visualization adapters or collectively renders the light extraction holes uncovered, and
 wherein the common protection cover includes a plurality of hollow portions that are recessed toward the respective light extraction holes of the plurality of communication light visualization adapters.

2. The communication light visualization module according to claim 1, wherein the common protection cover is attached to the housing so as to be movable between a closed position, in which the common protection cover collectively covers the light extraction holes of the plurality of communication light visualization adapters, and an open position, in which the common protection cover collectively renders the light extraction holes of the plurality of communication light visualization adapters uncovered.

3. The communication light visualization module according to claim 1, wherein the common protection cover is made of a material that transmits the communication light transmitted through the optical communication path.

4. The communication light visualization module according to claim 1, wherein the housing includes a hook portion engaged on a patch panel.

* * * * *